G. WOLTERS.
PROCESS FOR TREATING PEAT, SLIME, AND LIKE SUBSTANCES.
APPLICATION FILED JAN. 15, 1913.
1,074,400.
Patented Sept. 30, 1913.
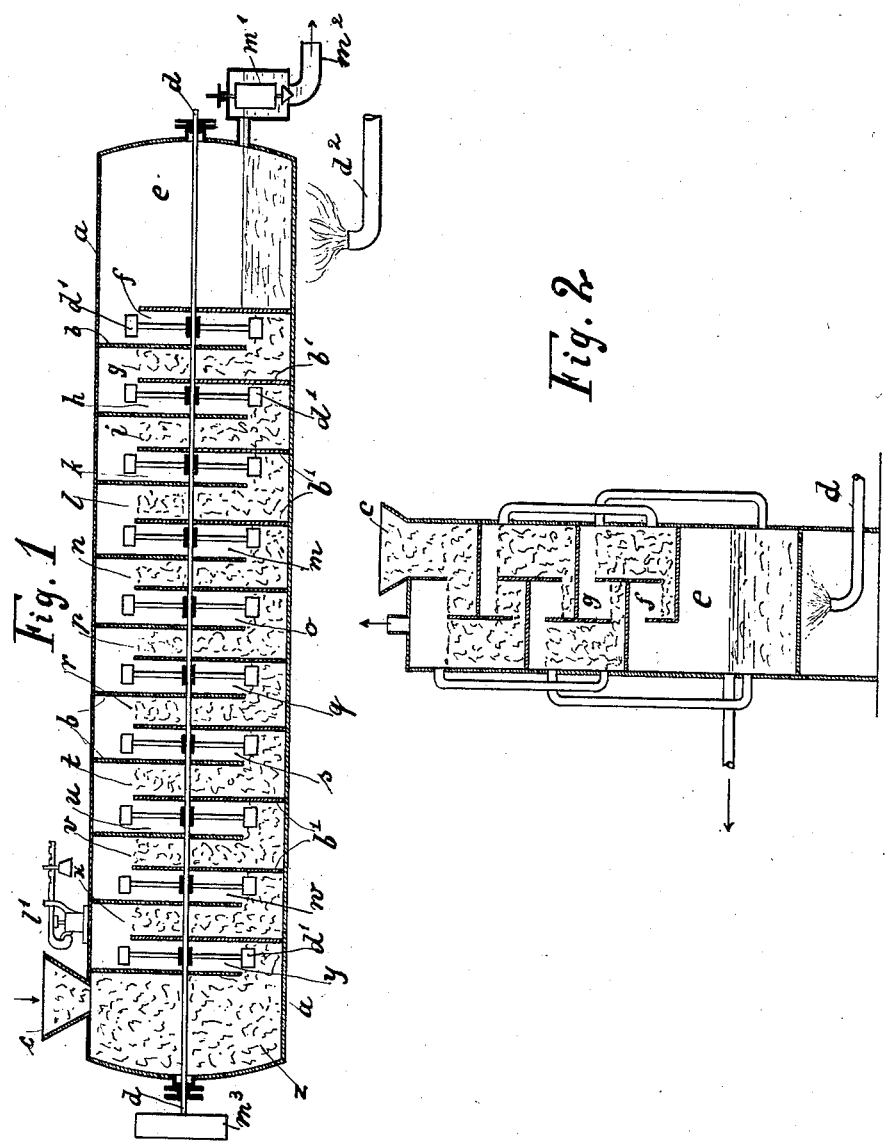
Witnesses:
Frank H Logan
Cornelius Hoving
Inventor
Gustav Wolters
By Frau Oldenneel
Attorney

UNITED STATES PATENT OFFICE.

GUSTAV WOLTERS, OF WEITMAR, NEAR BOCHUM, GERMANY.

PROCESS FOR TREATING PEAT, SLIME, AND LIKE SUBSTANCES.

1,074,400.  Specification of Letters Patent.  Patented Sept. 30, 1913.

Application filed January 15, 1913. Serial No. 742,182.

*To all whom it may concern:*

Be it known that I, GUSTAV WOLTERS, a subject of the Emperor of Germany, residing at Weitmar, near Bochum, Westphalia, Germany, have invented new and useful Improvements in Processes for Treating Peat, Slime, and like substances, of which the following is a specification.

Hitherto it was impossible to remove the water from peat, slime and like vegetable substances by pressure only, but it was necessary to subject the material to high temperatures in closed receptacles under pressure or to press the same through tubes in order to change the conditions of the material to such an extent that a mechanical drainage could be effected.

According to the present process the peat or the like is heated preparatory to mechanical drainage in communicating chambers, arranged in series, or side by side or superposed or concentrically positioned in such a manner that the generated vapors pass from one chamber to the other through the intermediary layer of the material to be drained. Now, as the material in each chamber forms a siphon-like seal, the pressure of the vapors will be increased from chamber to chamber toward the heat source always to an amount which corresponds to the height of the layer and consequently the pressure will be the highest at that point next to the heat source. It is thus possible to introduce the material into the first chamber of the series under any desired initial pressure, or, if this chamber is open, under atmospheric pressure and to feed it from chamber to chamber by means of any mechanical transporting device, such, for instance, as paddles or blades attached to a rotating shaft like propellers.

When heating the peat or the like, for instance, by superheated steam fed to one or more chambers, or by internally or externally heating single chambers, vapors are generated which tend to move in a direction reverse to that of the advancing peat, slime or the like, toward that chamber having the lowest pressure *i. e.* to that place where the material is introduced, so that the said vapors must pass through the material and heat the same gradually.

In the accompanying drawing Figure 1 is a section through an apparatus of the horizontal type for carrying my invention into effect and Fig. 2 a section through an apparatus of the vertical type.

In Fig. 1, $a$ is a horizontal boiler and $b$, $b'$ are partition walls, dividing the boiler into a series of chambers $f$, $g$, $h$, $i$, etc., $b$ being secured to the inner top-part and $b'$ to the inner bottom-part of the boiler. $c$ is the inlet opening for charging the boiler with peat, slime, mud or the like to be drained and $d$ is a shaft arranged in the longitudinal center line of the boiler. $d'$ $d'$ are stirrer blades or paddles secured to the said shaft, the scoops of the said paddles being twisted in such a manner, that when rotating the shaft $d$, the peat or the like will be carried by the said twisted scoops from the chamber $y$ to the chamber $x$, from $w$ to $v$ and so on. $d^2$ is a source of heat, heating the chamber $e$ provided at the end of the boiler. In heating said chamber $e$ vapors will be generated, the pressure of which increases gradually and acts on the surface of the peat or the like in chamber $f$ thus forcing it down to the edge of the partition wall $b$. The vapors may now enter into the chamber $g$ and pass through the material contained in the same whereby this material is heated. If the heating of chamber $e$ is continued, the vapors of said chamber will be continually forced into chamber $g$, so that the pressure of the vapors arising from the layer of material in said chamber $g$ will also be gradually increased. The vapors in chamber $g$ pass over the upper edge of the partition wall $b'$ into chamber $h$ and act on the surface of the material in said chamber, forcing that material downward until its level reaches the edge of the wall $b$ separating chamber $h$ from $i$. The vapors may now pass upward through the layer of material in chamber $i$ and heat the same. In this way the vapors are conducted through the series of chambers until they reach the chamber $x$, from which they may escape through valve $l'$. If desired the vapors could be fed over into the introducing chamber $z$ and allowed to escape through the inlet opening $c$. Valve $l'$ may be regulated in order to control the pressure in chambers $x$, $y$. In case of employing the said valve $l'$, it is evident, that the vapors in the chambers $v$ $w$ have to overcome only the resistance offered by the material in chambers $w$, $x$ in order to escape through said valve, while the vapors in chambers $t$, $u$ have to overcome the resistance of the material in chambers $u$, $v$, $w$, $x$, and therefore, the pressure of the vapors in the said chambers $t$, $u$ must be higher than that in the following chambers. From this it will be seen, that the pressure of the vapors in the consecutive chambers is the higher, the more remote the chambers lie from the introducing end of the boiler and as the peat or the like is fed continually toward the chamber $e$, it is subjected to a gradually increasing pressure and heat.

It is evident that the heating may be effected in such a manner that the vapors are condensed again when they reach the last chamber of the series. The outlet $m^2$ of the chamber $e$ may be provided with a regulating valve $m'$ for controlling the position of the level in said chamber. The heat of the mud flowing off and being fed later on to the press may be used for preheating the peat and in a like manner the waste heat of the boiler may serve for heating other chambers. As very high temperatures are required it may be advisable in some cases to change the construction of the chamber $e$ so as to form a separate boiler. In case the boiler should be heated by superheated steam, the latter must be introduced into the chamber $e$ by some suitable pipe arrangement. $m^3$ is a pulley driven from a suitable source of power.

Fig. 2 shows a vertical boiler in which the chambers are superposed. In this construction the feeding device for the peat or the like may be dispensed with in case the hottest chamber is provided at the bottom of the apparatus and the material to be treated is introduced from the top of the same.

I claim as my invention:—

1. A process of treating peat, slime and like vegetable substances of a high degree of humidity, consisting in forcing the substance into a chamber comprising a plurality of communicating compartments, passing the substances successively from one compartment to another through said chamber, supplying heat to the off-take end of said chamber, and causing the vapors generated in the chamber from the substance to pass successively from one compartment to the other through the substance toward the intake end of the chamber, the pressure and temperature in the successive compartments increasing toward the off-take end of the chamber.

2. The process of treating peat, and like substances, consisting in forcing the substance successively from one to the next of a series of communicating compartments, and simultaneously forcing heat from the opposite end of said series successively through said series of compartments in such manner that the pressure and temperature of the vapor which is generated by the heat in the substance will regularly increase toward the source of heat.

In testimony whereof I affix my signature in the presence of two witnesses.

GUSTAV WOLTERS. [L. S.]

Witnesses:
HELEN NUFER,
ALBERT NUFER.

---

Copies of this patent may be obtained for five cents each, by addressing the "Commissioner of Patents, Washington, D. C."